May 18, 1943 C. N. FRY Re. 22,315
DROP-OUT SWITCH
Original Filed May 5, 1939 2 Sheets-Sheet 1
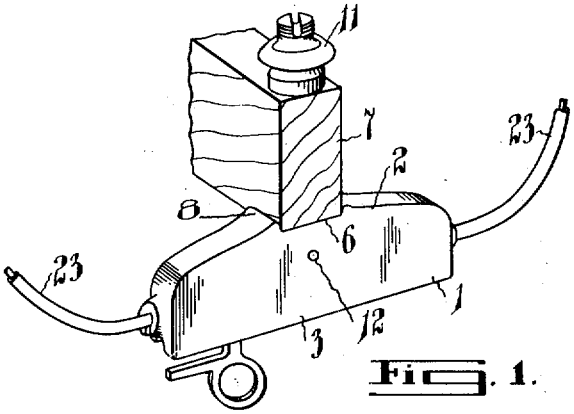
Fig. 1.
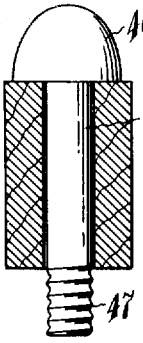
Fig. 7.
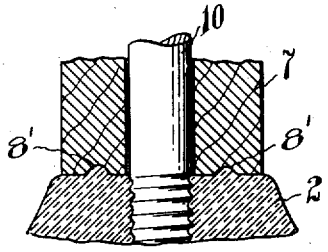
Fig. 4.
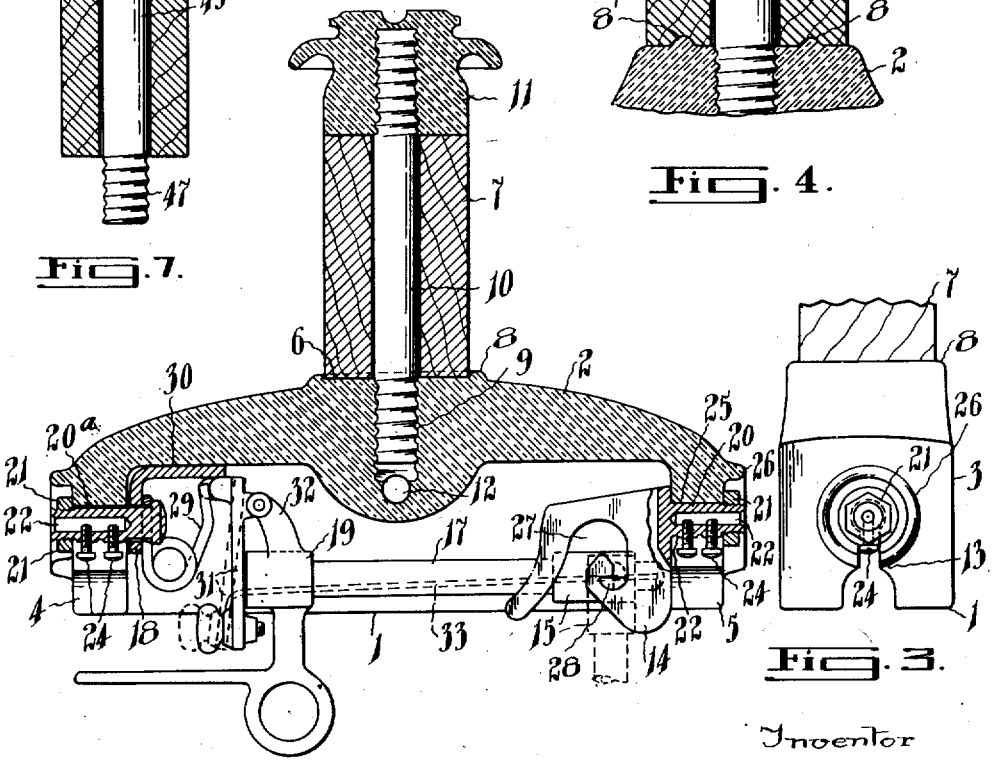
Fig. 2.
Fig. 3.
Inventor
C. N. Fry
By George P. Thoche
Atty.

May 18, 1943 C. N. FRY Re. 22,315

DROP-OUT SWITCH

Original Filed May 5, 1939 2 Sheets-Sheet 2

Inventor

C. N. Fry

By George P. Mackie

Attys.

Reissued May 18, 1943

Re. 22,315

UNITED STATES PATENT OFFICE 22,315

DROP-OUT SWITCH

Clifford N. Fry, Toronto, Ontario, Canada, assignor to Line Material Company, Milwaukee, Wis., a corporation of Delaware Original No. 2,264,203, dated November 25, 1941, Serial No. 271,845, May 5, 1939. Application for reissue August 27, 1942, Serial No. 456,382. In Canada September 21, 1938

25 Claims. (Cl. 200—114)

This invention relates to electric switches of the enclosed or housed type, that is, the type in which the switch mechanism is enclosed in a casing of porcelain or other suitable insulating material.

Electric switches, including fuses, may be classed as unhoused or open type and housed type. In the open type, the live parts are exposed to sleet and to contact by animate objects such as birds and squirrels. In the housed type, the live parts are usually well shielded against sleet and contact. Both types are usually mounted so that connected terminals are disposed one above the other.

When switches comprising fuses of the open type are mounted in a vertical position, it is necessary to close the upper ends of the fuse cartridge to prevent sleet from entering the cartridge; otherwise operation of the fuse may be seriously hampered by the collection of sleet in the cartridge.

When switches comprising fuses are mounted in housings to guard the live parts, the upper ends of the cartridges must be closed to prevent gas entering the housings when the fuse operates.

In either case, the closing of one end of the fuse cartridges very materially decreases the current interrupting capacity of the fuses and may subject the cartridge to powerful recoil forces during circuit interrupting operations which may damage it and the supporting structure.

Open type fuses have heretofore been provided with expulsion fuse cartridges open at both ends and mounted in a horizontal position to minimize the effect of sleet collecting thereon. However, the live parts have not been adequately guarded.

It may be further noted that in the housed type of fuse it is essential to provide a door for the housing so that the live parts may be fully enclosed against sleet and contact. However, when the fuse has operated, the door may open and expose the live parts sufficiently to destroy the effectiveness of the housing.

Accordingly, it is an object of this invention to provide a housing for a fuse which will adequately protect all live parts at all times and which will permit the use of a fuse cartridge open at both ends, thus securing a maximum current interrupting capacity with a minimum of structural strength.

This object and others which will appear hereafter are achieved by means of a structure adapted for mounting beneath a support, such as a cross-arm, and by disposing the fuse cartridge with its axis in a horizontal plane and wholly within a housing completely overlying the fuse mechanism.

Figure 5:
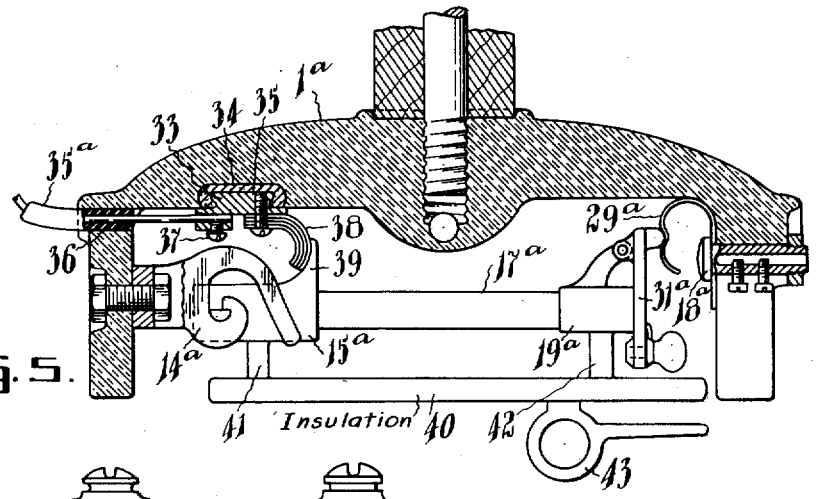
Figure 6:
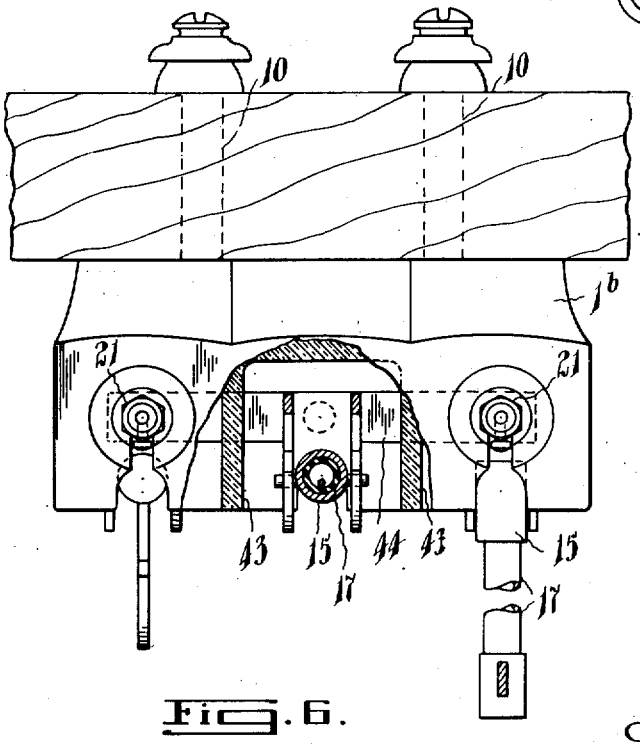

I attain my object by means of the constructions hereinafter described and illustrated in the accompanying drawings in which Fig. 1 is a perspective view showing the switch mounted on a pole arm;

Fig. 2 an enlarged longitudinal sectional view;

Fig. 3 an end view of the housing;

Fig. 4 a detail sectional view showing a modified form of engagement between the casing and supporting arm;

Fig. 5 a view similar to Fig. 2 showing a modified arrangement;

Fig. 6 an end view, partly broken away, showing a multiple or repeater switch arrangement; and Fig. 7 a detail illustrating another form of insulating pin.

In the drawings like numerals of reference indicate corresponding parts in the different figures.

According to the preferred manner of carrying the present invention into effect an elongated insulating casing 1 preferably of glazed porcelain is provided here shown comprising a top having a centrally disposed mounting abutment 2 and provided with down-turned rectangularly disposed side flanges 3 and heavy end flanges 4 and 5.

As shown in Figures 1 to 3 the abutment or massive portion of the top 2 slopes upwardly to a horizontal seat portion 6 adapted to bear against the underside of a pole arm 7 or the like and parallel spaced rib projections 8 are adapted to cooperate with the bottom shoulders of the arm 1 to position the casing in right angular relation to the arm.

According to the modification shown in Figure 4 the ribs or protuberances 8' are placed so that they embed themselves in the under surface of the arm to effect an accurate positioning of the casing.

The abutment portion of the top 2 is provided with a vertical orifice 9 preferably moulded with a round shouldered thread to receive the lower threaded end of a mounting pin 10 which is preferably of wood to avoid the necessity of grounding, the arm 7 being bored vertically to receive the pin 10 and an insulator 11 is adapted to be threaded on the upper threaded end thereof to not only mount the insulator but also draw the insulating casing into firmly clamped relation to the arm 7.

A horizontal opening 12 intersects the bottom of the threaded orifice 9 so that any moisture that may find its way thereinto will be drained outwardly.

Referring to Fig. 2, the housing has a stationary terminal mounted therein at each end. The terminal 14 is arranged to hingedly and detachably receive the terminal 15 on the end of the fuse-holding tube 17, while the terminal 18 is arranged as a latch to releasably engage the terminal 19 on the other end of the tube 17.

The terminal 14 is provided with a threaded stem 20, which extends through a hole 25 in the end wall 5 of the housing. A lock or securing nut 21 is threaded upon the stem to retain the terminal in place. This stem is formed with a bore 22 to receive the bare end of an insulated conductor 23, which conductor is held in place by one or more set screws 24 threaded through the wall of the stem. It will be noted from Fig. 3 that the hole or notch 25 extends to the bottom of the end wall, but is provided with abutments 13 to support the stem 20. The abutments, however, are spaced apart a sufficient distance to permit the entrance of a screw driver or other tool for tightening or loosening the set screws 24.

It will be noted that a rib 26 is formed integral with the end of the housing extending over and down each side of the stem 20, thus forming a recess to receive the securing nut 21 and protect it from accidental contact by birds or squirrels.

It will be noted also that the set screws 24 tend to prevent any rotary movement of the stem 20 in the hole 25.

The terminal 14 is provided with spaced arms, which are formed with a curved slot 27, the ends of which are formed as bearings to receive trunnions 28 on the tube terminal 15. The terminal 18 comprises a heading stem 20ª and a spring retainer 29, and a bumper 30. The stem extends through a hole in the other end wall 4 of the housing. This stem 20ª is formed with a bore 22 to receive the bare end of the other conductor 23, and the projecting end of said stem 20ª is threaded to receive a securing nut 21 to retain it in place.

The spring retainer 29 is mounted on the stem 20ª, this retainer along with a bumper member 30 being clamped in place between the head of the stem 20ª and the inside of the end wall of the housing by tightening up the nut 21. A latch member 31 pivoted on an arm 32 extending from the side of the tube terminal 19 has a shoulder adjacent its end which shoulder engages the spring 29. This latch member is held in the latching position as shown in full lines by the fusible link 33. Upon the fusing of the link, the latch member 31 will swing under the action of the spring retainer 29 to the dotted line position, thus permitting the tube to swing downwardly. It will be seen, therefore, that while the fusible link is unbroken, the retaining member 29 will hold the tube or cartridge in circuit-closing position, but upon the rupture of the fuse, the latch member 31 is free to rock, and consequently the retainer 20 does not function to hold the tube shown.

It will be readily appreciated that a construction such as defined will provide a highly desirable protection of the switching elements against the deleterious action of the weather and there will be little possibiliy of ice formation interfering with the desired action of the fuse-released member. The construction will also provide a maximum of protection from short-circuiting by birds or squirrels.

Furthermore, the direct mounting of the unit on the arm eliminates the use of expensive metallic mounting brackets which are constantly subject to deterioration.

By virtue of the fact that the housing or casing 1 is mounted in horizontal posture, the two end walls 4 and 5 can be cut away, as shown in Fig. 3, in axial alignment with the fuse holding tube 17 so that when the fuse blows the gases are expelled from the tube in both directions without impediment and without any opportunity to become temporarily entrapped below the casing. This affords a more expeditious breaking of the arc, even before the tube drops, while at the same time protection of the fuse mechanism against intrusion of rain, snow, and sleet is not effectively impaired. This is a feature which could not well be achieved in a vertically mounted housed fuse structure because the overhead gas discharge opening in the housing which would be required would permit influx of rain, snow, and sleet—thus defeating the main function of the housing.

I am aware that fuse release switches of this type have been in use for some time but the practice heretofore has invariably involved the vertical or substantial vertical mounting of the fuse holder so that the full gravitational opening influence was not utilized during the initial opening stage, and furthermore, the vertical mounting even where attempts were made to partly enclose the mechanism left the fuse holder and co-operating parts objectionably exposed to the elements, whereas the present invention obviates these difficulties.

In Fig. 5 a modified form of switch is shown. The housing 1ª is supported in a similar manner to the housing 1. The terminal 18ª is secured in place in the same manner as the terminal 18 and the hinge bracket 14ª is secured in place in the same manner as the terminal 14. The hinge bracket 14ª, however, does not act as a terminal, and a special terminal 33 is secured to the back of the housing, preferably having a projection 35 on the back extending into a notch 34 on the housing and secured in place by lead. The line wire 35ª extends through a hole 36 in the end of the housing and its end is secured to the terminal by a screw 37. On this terminal is mounted a spring contact 38, which is adapted to be engaged by a contact arm 39 formed integral with the terminal 15ª on the tube 17ª. The latch member 31ª and spring contact 29ª operate in a similar manner to the corresponding parts 31 and 29 of Fig. 2.

I may, if desired, provide a cover for the under side of the housing. Such a cover 40 is shown in Fig. 5, but may be applied also to the form of device shown in Fig. 2. The cover which is formed of porcelain, or other suitable insulating material, is preferably supported by brackets 41 and 42 formed integral respectively with the terminals 15ª and 19ª. The cover is provided with a handle 43.

In the form of invention shown in Fig. 2, it will be noted that the hinge bracket terminal is always connected with the power line, and care must be exercised therefore in making fuse link replacements. In the case of the construction shown in Fig. 3, when the fuse link is blown and the tube drops, the hinge bracket is "dead," as the spring 38 and arm 39 are separated, and replacements could be made without the use of special tools.

In Fig. 6 I show a housing 1b adapted for a multiple number of fuses. The housing is preferably provided with integral partitions 43 to form separate fuse chambers. In view of the width of the housing, I may provide two supporting pins 10 as shown. The terminals are secured in place in the same manner as the terminals 14 and 18 by stems extending through openings in the ends of the housing and secured in place by nuts 21.

The tubular members 17 may be independently operated, but will usually be arranged as part of a "repeater switch" in which upon the blowing of one fuse, another unit is substituted in the circuit. As the mechanism for causing this repeater action is not part of the present invention it is neither shown nor described. It will be apparent, however, that the terminals at the load or output end of the housing will be electricallly connected together by a bus bar 44, or other suitable means, while at the line end, means will be provided for, upon the blowing of a fuse in one unit, automatically switching in a fresh unit.

In Fig. 6, one tubular member is shown in "blown" position, while the other two are shown in "set" position. In Fig. 7 a modified form of supporting pin is shown. The pin 45 is formed of wood or other insulating material, and is provided at one end with an integral head 46, its other end being threaded at 47 for insertion in the opening in the back of the housing.

What I claim as my invention is:

1. In a circuit interrupter of the fuse-release type, an insulating casing closed at the top and having downwardly depending side and end walls, means directly co-operating with said casing and with a suitable support for rigidly securing said casing in a horizontal position opening downwardly, terminals entering said casing through the opposite ends thereof in horizontally spaced relation, and a fuse-released switch member co-operatively interposed between said terminals within the casing in a normal substantially horizontal position and adapted to swing downwardly to a substantially vertical position on the rupturing of the fuse.

2. In a circuit interrupter, the combination of an insulating housing having a back and side and end walls integral with said back; means for supporting said housing with its open front directed downwardly; a terminal supported by one of the end walls of the housing in such a manner that a portion of said terminal is disposed within the housing and another portion of said terminal is extended to the outside of said housing; a second terminal supported by the opposite end wall of said housing in such manner that a portion of said second terminal is disposed within the housing and another portion of said second terminal is extended outside of said housing; a fuse cartridge for bridging said first mentioned and said second mentioned terminals and movable into closed circuit and open circuit positions; and a fuse link for holding said fuse cartridge in the closed switch position when said fuse link is intact and adapted to permit the fuse cartridge to move to the open switch position when said fuse link is ruptured.

3. In a circuit interrupter, the combination of an integral elongated housing of insulating material comprising a back, side and end walls; means for supporting said housing with its front directly downwardly; a pair of terminals within said housing one adjacent each end thereof, circuit making and breaking means extending longitudinally of the housing for bridging said terminals, each end wall having an opening formed therethrough, and each terminal including a mounting stem of conducting material extending through said opening; and means for connecting a conductor to one of said mounting stems.

4. The combination with a horizontally extending pole arm having a hole formed vertically therethrough, of an electric switch having a substantially rectangular shaped housing formed of insulating material closed for its full length on the upper side and having downwardly depending side and end walls; a mounting pin secured centrally of the closed top side and extending through said hole in the pole arm; means carried by said closed side for non-rotatably interlocking with the pole arm; and circuit making and breaking means in said housing.

5. The combination with a horizontally extending pole arm having a hole formed vertically therethrough, of an electric switch having a substantially rectangular shaped housing formed of insulating material closed for its full length on the upper side and having downwardly depending side and end walls; a mounting pin of insulating material secured centrally of the closed top side and extending through said hole in the pole arm; and circuit making and breaking means in said housing.

6. The combination with a horizontally extending pole arm having a hole formed vertically therethrough, of an electric switch having a substantially rectangular shaped housing formed of insulating material closed for its full length on the upper side and having downwardly depending side and end walls, said closed top side having a threaded orifice formed substantially centrally thereof; a headed mounting pin extending through the hole in the pole arm into the orifice in the housing, the head of said pin being formed of insulating material; and circuit making and breaking means in said housing.

7. In a circuit interrupter, the combination of a housing of insulating material and comprising a back, side walls and end walls; circuit making and breaking means in said housing; and a mounting pin of insulating material secured substantially centrally of the back of the housing and projecting therebeyond for securement to a support.

8. In electrical apparatus, the combination of a housing of insulating material, electrical apparatus in said housing, said housing having a threaded socket formed in its wall; and a mounting pin of insulating material threaded in said socket and projecting from said housing for securement to a suitable support.

9. For use in a circuit interrupter, an integral housing of insulating material comprising a back, side walls and end walls, one of said end walls being of lesser height than the side walls, said end wall having a keyhole shaped opening formed therethrough, the narrow portion of said opening extending to the peripheral edge of said end wall, the other end wall having a hole formed transversely therethrough.

10. For use in a circuit interrupter, an integral housing of insulating material comprising a back, side walls and end walls, one of said end walls being of lesser height than the side walls, said end wall having a keyhole shaped opening formed therethrough, the narrow portion of said opening extending to the peripheral edge of said end wall; the other end wall having a hole formed transversely therethrough, and means at each end for shielding terminal members that may be located in said opening.

11. In a circuit interrupter, the combination of an integral, elongated housing of insulating material comprising a back, side and end walls, means for supporting said housing with its front directed downwardly, a pair of terminals within said housing one adjacent each end thereof, circuit making and breaking means extending longitudinally of the housing for bridging said terminals, each end wall having an opening formed therethrough and each terminal including a mounting stem of conducting material extending through said opening to the outer wall so as to be directly accessible from the outside of the housing for wiring, and means for connecting a conductor to at least one of said mounting stems, means at each of said ends of said housing for shielding the outer ends of said mounting stems.

12. An electric switch including an insulating housing disposed in a substantially horizontal position and open at the bottom, said housing being provided with a top wall, side walls and end walls, a terminal supported by one of the end walls in such manner that a portion of said terminal is disposed within said housing and another portion of said terminal is extended through one of the end walls to the outside of said housing so as to be directly accessible from the outside of the housing for wiring, a second terminal member supported by the opposite end wall of said housing in such manner that a portion of said second terminal is disposed within said housing and another portion of said second terminal is extended through said opposite wall to the outside of said housing so as to be directly accessible from the outside of the housing for wiring, means at the end portions of said housing adjacent said terminals for shielding the portions of said terminals which extend through said end walls of the housing, a fuse cartridge for bridging said first-mentioned and second-mentioned terminals and movable into closed-circuit position and open-circuit position, and means including a fuse link for holding said fuse cartridge in the closed position when said fuse link is intact and adapted to permit the fuse cartridge to move to open position when said fuse link is ruptured.

13. In a circuit interrupter, the combination with a support, of an insulating housing suspended from said support and comprising an elongated substantially horizontal base and spaced skirts integral with and depending from said base, a terminal adjacent each end of the housing and secured therein, said terminals having means for securing line conductors thereto, a fuse assembly including a fuse tube pivotally supported by the housing and electrically joining said terminals, said skirts affording an opening adjacent the ends of said fuse assembly, said skirts and base shielding the fuse assembly and terminals and adapting the housing for mounting of a fuse tube therein open at both ends.

14. In a circuit interrupter of the fuse-released type, an insulating casing closed at the top and having downwardly depending sides, means directly co-operating with the casing and with a suitable support for rigidly securing said casing in a horizontal position opening downwardly, terminals within the casing, and a fuse-released switch member co-operatively interposed between said terminals within the casing in a normal substantially horizontal position and adapted to swing downwardly to a substantially vertical position on the rupturing of the fuse, said sides affording an opening adjacent the ends of said fuse-released switch member.

15. In a circuit interrupter, the combination of an integral elongated housing of insulating material comprising a back and side walls, means for supporting said housing with its front directed downwardly; a pair of terminals within said housing one adjacent each end thereof, circuit making and breaking means extending longitudinally of the housing for bridging said terminals, said side walls affording an opening adjacent each end of said circuit making and breaking means.

16. In a circuit interrupter, the combination of an integral elongated housing of insulating material comprising a back and side walls, means for supporting said housing with its front directed downwardly; a pair of terminals within said housing one adjacent each end thereof, circuit making and breaking means extending longitudinally of the housing for bridging said terminals, and including an expulsion tube open at both ends adjacent the open ends of said housing, said side walls affording an opening adjacent each end of said expulsion tube.

17. In combination, a housing of dielectric material having a cavity for the reception of fuse structure, one side only of said housing being open, said housing being designed for mounting with said open side down, and fuse structure carried by said housing and disposed principally within said cavity, said fuse structure being effectively shielded by said housing against rain, sleet, and snow, said fuse structure including an elongated fuse-holding tube having its longitudinal axis normally in a horizontal plane, and a fuse-link disposed within said tube, said housing being formed to provide a direct unobstructed passageway to the atmosphere exterior of said housing for gases expelled from at least one end of said tube, thereby forestalling entrapment of conductive gases within said cavity to such extent as would likely give rise to arcing-over when a violent fuse blow-out occurs within said tube.

18. In combination, a housing of dielectric material having a cavity for the reception of fuse structure, one side only of said housing being open, said housing being designed for mounting with said open side down, and fuse structure carried by said housing and disposed principally within said cavity, said fuse structure being effectively shielded by said housing against rain, sleet, and snow, said fuse structure including an elongated fuse-holding tube having its longitudinal axis normally in a horizontal plane, and a fuse-link disposed within said tube, said housing being formed to provide direct unobstructed passageways to the atmosphere exterior of said housing for gases expelled from both ends of said tube, thereby forestalling entrapment of conductive gases within said cavity to such extent as would likely give rise to arcing-over when a violent fuse blow-out occurs within said tube.

19. In combination, a housing of dielectric material having a cavity for the reception of fuse structure, said housing consisting of a top wall portion disposed in a horizontal plane, and vertical wall portions depending from and integral with said top wall portion, said wall portions, conjointly, defining said cavity, said cavity being unclosed at the bottom but otherwise substantially completely enclosed, fuse structure carried by said housing and including a pair of spaced terminals, an elongated fuse-holding tube, and a fuse-link within said tube and interconnecting said terminals, said tube being mounted within said cavity and having its longitudinal axis disposed horizontally, at least one end of said tube being open, one of said vertical wall portions being notched to provide a direct unobstructed passageway in alignment with said open end for expulsion of gaseous discharges from said tube to the atmosphere exterior of said housing, thereby forestalling entrapment of conductive gases within said cavity to such extent as would likely give rise to arcing-over across said terminals when said fuse-link blows.

20. In combination, a housing of dielectric material having a cavity for the reception of fuse structure, one side only of said housing being open, said housing being designed for mounting with said open side down, and fuse structure carried by said housing and disposed principally within said cavity, said fuse structure being effectively shielded by said housing against rain, sleet, and snow, said fuse structure including a pair of spaced terminals, an elongated fuse-holding tube hinged at one end only, and a fuse-link interconnecting said terminals and extending through said tube, said fuse link operating normally to hold said tube with its longitudinal axis in a horizontal plane, the unhinged end of said tube being free to drop when said fuse-link blows.

21. The combination with a horizontalliy extending cross-arm, of a line protective device comprising a dielectric housing carried by and secured to the under side of said cross-arm, and depending therefrom, said housing having a cavity for the reception of fuse structure, the under side only of said housing opening into said cavity, and fuse structure carried by said housing and disposed principally within said cavity, said fuse structure being effectively shielded by said housing against rain, sleet, and snow, said fuse structure including a pair of spraced terminals, an elongated fuse-holding tube and a fuse-link interconnecting said terminals and extending through said tube, the longitudinal axis of said tube being normally disposed in a horizontal plane.

22. The combination with a horizontally extending cross-arm, of a line protective device comprising a dielectric housing carried by and secured to the under side of said cross-arm and depending therefrom, said housing having a cavity for the reception of fuse structure, the under side only of said housing opening into said cavity, and drop-out fuse structure carried by said housing and disposed principally within said cavity, said fuse structure being effectively shielded by said housing against rain, sleet, and snow, said fuse structure including a pair of spaced terminals, an elongated fuse-holding tube hinged at one end only, and a fuse-link interconnecting said terminals and extending through said tube, said fuse-link functioning normally to hold said tube with its longitudinal axis in a horizontal plane, the free end only of said tube being arranged to drop, with said hinged end acting as a fulcrum, when said fuse-link blows.

23. A line protective device comprising an elongated, rectangular, dielectric housing arranged to be carried by and secured to the under side of a cross-arm in depending relation thereto, said housing having a cavity defined by a horizontally extending top portion, a pair of horizontally elongated vertical side walls and a pair of vertical end walls, said side walls and end walls depending from and integral with said top portion, the under side only of said cavity being open, and fuse structure disposed principally within said cavity, and shielded by said housing against rain, sleet, and snow, said fuse structure including a pair of spaced terminals, an elongated fuse-holding tube and a fuse-link interconnecting said terminals and extending through said tube, the longitudinal axis of said tube being normally disposed in a horizontal plane and extending lengthwise of said housing.

24. In a circuit interrupter, the combination of an integral elongated housing of insulating material comprising back and side walls, means for supporting said housing in a horizontal position; a pair of terminals within said housing one adjacent each end thereof, circuit making and breaking means bridging said terminals and including an expulsion tube open at both ends, said side walls affording an opening adjacent each open end of said tube, said tube and terminals being otherwise enclosed by said housing and fully protected from the collection of sleet.

25. In a circuit interrupter, the combination of an integral elongated housing of insulating material comprising back and side walls, means supporting said housing in a horizontal position; a pair of terminals within said housing one adjacent each end thereof, circuit making and breaking means bridging said terminals and including an expulsion tube vented for the expulsion of gas endwise thereof, the ends of said tube being adjacent the ends of said housing and the walls of said housing affording free and unobstructed expuusion of gases from said tube to the exterior of said housing, said tube and terminals being enclosed by said housing and fully protected from the collection of sleet.

CLIFFORD N. FRY.